United States Patent [19]

Ben-David

[11] Patent Number: 5,497,252
[45] Date of Patent: Mar. 5, 1996

[54] INTERNAL DRUM PLOTTER WITH MULTIPLE FOCAL POINT HOLOGRAPHIC OPTICAL ELEMENT

[75] Inventor: Ilan Ben-David, Petach Tikva, Israel

[73] Assignee: Scitex Corporation Ltd., Herzlia, Israel

[21] Appl. No.: 107,970

[22] Filed: Aug. 17, 1993

[30] Foreign Application Priority Data

Aug. 30, 1992 [IL] Israel .......................................... 102996

[51] Int. Cl.$^6$ .............................. G02B 5/32; G02B 26/10; G02B 26/18; G06K 7/10
[52] U.S. Cl. ............................. 359/17; 359/216; 359/205; 359/197; 235/457
[58] Field of Search .................. 359/17, 204, 18, 359/212, 197, 212, 216, 205; 235/457

[56] References Cited

U.S. PATENT DOCUMENTS

| | | | |
|---|---|---|---|
| 3,922,059 | 11/1975 | Noguchi | 359/17 |
| 4,137,777 | 2/1979 | Haverl et al. | 73/620 |
| 4,239,971 | 12/1980 | Cushman | 250/439 |
| 4,289,371 | 9/1981 | Kramer | 359/569 |
| 4,333,006 | 6/1982 | Gorin et al. | 359/18 |
| 4,337,994 | 7/1982 | Brasier | 359/18 |
| 4,577,932 | 3/1986 | Gelbart | 359/305 |
| 4,591,242 | 5/1986 | Broockman | 359/17 |
| 4,782,228 | 11/1988 | Westell | 250/236 |
| 4,853,709 | 8/1989 | Stein et al. | 359/212 |
| 5,175,421 | 12/1992 | Harris | 359/226 |
| 5,291,007 | 3/1994 | Sakai | 359/17 |

OTHER PUBLICATIONS

Technical Report #384, issued Aug. 1978 by Isomat Corp. "Technical Report on Multibeam Laser Scanning".
S. B. Tokes, "Applications of Multi–Beam Acousto–Modulators in Laser–Electrophotographic Printing and Drawing Machines", SPIE Proceedings No. 396, 1983.
B. J. Chang, et al., "Holographic Optical Elements (HOEs)", Advances in Laser Scanning Technology, SPIE Proceedings vol. 299, pp. 157–162, Aug. 1981.
Yozo Ono and Noboo Nishido, "Holographic Laser Scanners Using Generalized Zone Plates", Applied Optics, vol. 21, No. 24, Dec. 15, 1982, pp. 4524–4548.

*Primary Examiner*—Paul M. Dzierzynski
*Assistant Examiner*—Audrey Chang
*Attorney, Agent, or Firm*—Ladas & Parry

[57] ABSTRACT

An internal drum plotter in which a multiple focal point holographic element receives respective modulated light beams, one for each focal point, to focus the light beams on a light sensitive medium on the internal surface of the drum. The holographic element is rotated to trace the modulated light beams in separate, respective lines on the light sensitive medium.

11 Claims, 9 Drawing Sheets

INTERNAL DRUM PLOTTER WITH MULTIPLE FOCAL POINT HOLOGRAPHIC OPTICAL ELEMENT

FIELD OF THE INVENTION

The present invention relates generally to multi-beam optical elements and to multi-beam optical elements forming part of plotters and scanners in particular.

BACKGROUND OF THE INVENTION

Figure 1:
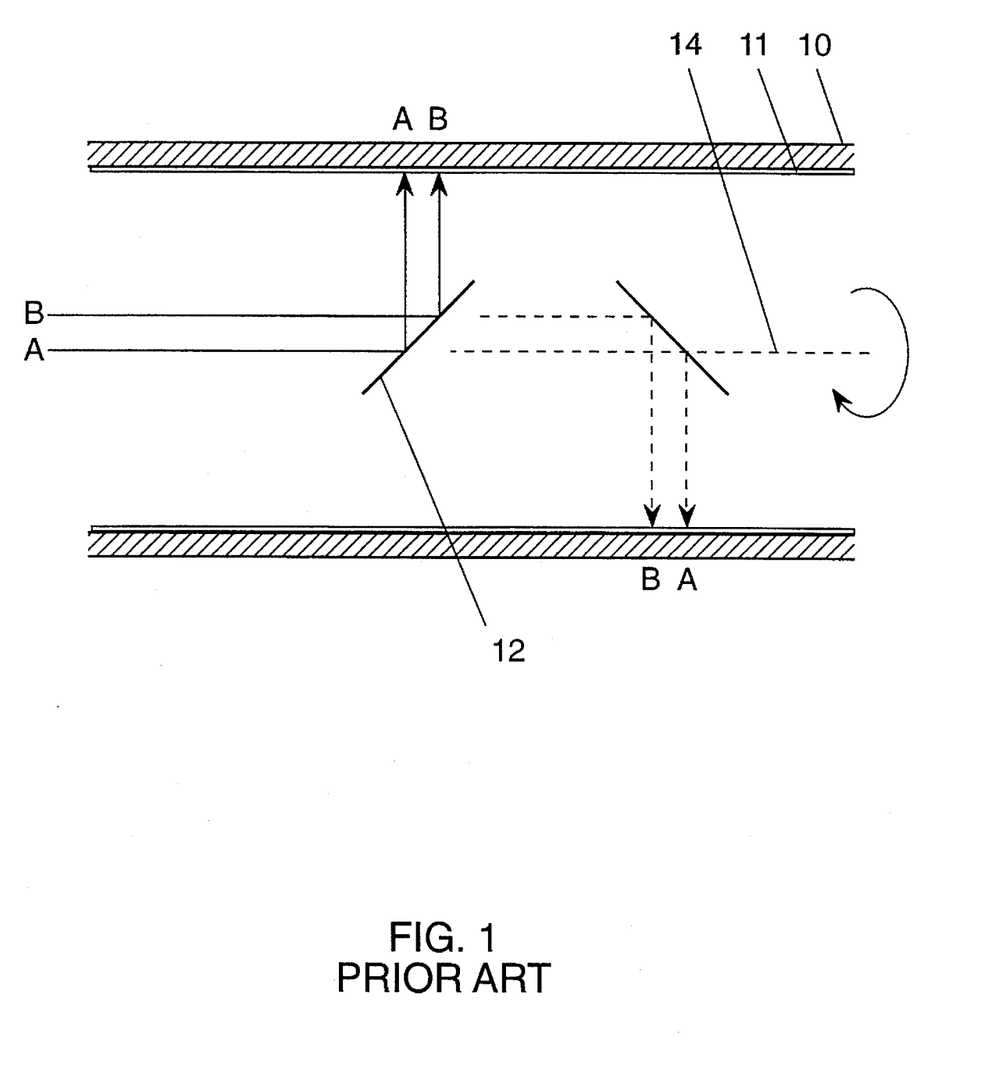
FIG. 1 is a schematic side view illustration of a prior art internal drum plotter.

Plotters and scanners are well known in the art, as are internal drum plotters. The Dolev plotter, manufactured by Scitex Corporation Ltd. of Herzlia, Israel, is one example of an internal drum plotter. A schematic side view of an internal drum plotter is shown in FIG. 1.

Internal drum plotters typically comprise a cylindrical element 10, onto the inner surface of which is placed a medium 11 to be exposed. Inside of cylindrical element 10 is an optical system for bringing a light beam, labeled 'A', from a light source (not shown) onto the inner surface of cylindrical element 10. In most internal drum plotters, the optical system minimally comprises a lens (not shown) for focusing the light beam and a rotatable mirror or prism 12, which rotates about a central axis 14 of the cylindrical element 10, for directing the light beam to the desired location.

Thus, if the optical system only rotates, the light beam A marks a circular path along the inner surface of cylindrical element 10 and in that manner, exposes the medium 11. However, mirror 12 is typically translated while rotating and thus, light beam A scans along a spiral path.

It is often desired to increase the operating speed of the internal drum plotter. In the prior art, this has been implemented in one of three ways:

(a) increasing the rotation speed of the mirror 12;

(b) providing multiple beams, such as beams A and B of FIG. 1, to mirror 12; or c) a combination of (a) and (b).

The first solution is limited by the quality and characteristics of available motors and bearings since, among other problems, the mirror 12 is rarely perfectly balanced and the better quality motors and bearings which are operative to rotate mirror 12 in a balanced manner are very expensive.

The second solution requires that each beam write a different line of the medium 11. Thus, in the system of FIG. 1, beam A exposes a first, leftmost line and beam B exposes a second, rightmost line, as shown in the upper portion of the Figure. After the mirror 12 rotates a full 180 degrees, as shown in the righthand portion of the Figure, the beams A and B are in opposite positions and thus, beam A exposes the rightmost line and beam B exposes the leftmost line.

Since the above scenario is unacceptable, prior art internal drum plotters utilizing multiple beams either use a flat mirror and only expose 180 degrees of the cylindrical element or they incorporate an image rotating system, such as a dove prism, into the system. The latter solution adds another optical element into the system which adds complexity to the system, especially since a dove prism additionally has to be rotated half as fast as the mirror 12.

Use of more than one scanning beam for scanning a photosensitive film is known for external drum and flat bed scanners. Methods for generating a plurality of scanning beams and employing them in external drum and flat bed applications are described in the following documents, the disclosures of which are incorporated herein by reference:

Technical Report #384, issued in August 1978 by Isomet Corporation, P.O.B. 1634, Port Royal Rd., Springfield Va., USA, and entitled: "Technical report on multibeam laser scanning";

"Applications of multi-beam acousto-modulators in laser-electrophotographic printing and drawing machines", Tokes, S. B., SPIE Proceedings No. 397, 1983;

U.S. Pat. No. 4,577,932 to Gelbart; and

Israel Patent Application 100635, assigned to the common assignees of the present invention.

U.S. Pat. No. 4,591,242 to Brookman et al. describes an optical scanner having multiple simultaneous scan lines with different focal lengths. The optical scanner comprises a plurality of lasers and a common optical element through which the entirety of beams from the lasers pass. Each laser beam is associated with its own optical element which focuses the beam at its unique distance from the common optical element.

U.S. Pat. No. 4,289,371 to Kramer describes an optical scanner using plane linear diffraction gratings on a rotating spinner.

SUMMARY OF THE INVENTION

It is an object of the present invention to provide improved apparatus for multiple beam exposure for scanning devices, wherein the improved apparatus utilizes a minimum number of optical elements.

There is therefore provided, in accordance with a preferred embodiment of the present invention, a scanning device including a) a multiple focal point optical element having a plurality of focal points and b) a motion assembly which moves the multiple focal point optical element, thereby to affect scanning.

There is further provided, in accordance with the present invention, an internal drum plotter including a) a multiple focal point optical element having a plurality of focal points and b) a motion assembly which moves the multiple focal point optical element, thereby to effect plotting.

Additionally, in accordance with a preferred embodiment of the present invention, the present invention also includes at least one light source for providing a plurality of light beams and wherein the multiple focal point optical element is operative to focus the plurality of light beams each onto its corresponding one of the plurality of focal points.

Moreover, in accordance with a preferred embodiment of the present invention, the focal points are off-axis to a rotation axis of the multiple focal point optical element.

Further, in accordance with one embodiment of the present invention, a first one of the light beams impinges upon a first area of the multiple focal point optical element and a second one of the light beams is parallel with the first one of the light beams and impinges on a second area of the multiple focal point optical element. Alternatively, the second one of the light beams is concentric with the first one of the light beams and impinges on a second area of the multiple focal point optical element.

Still further, in accordance with a preferred embodiment of the present invention, the first area is circular and the second area is tubular and concentric with the first area.

Additionally, in accordance with one embodiment of the present invention, the multiple focal point optical element is a diffractive optical element. Alternatively, it can be an holographic optical element.

Further, in accordance with a preferred embodiment of the present invention, the motion assembly comprises a housing operative to absorb a portion of the light beams not focussed on the focal points.

Still further, in accordance with a preferred embodiment of the present invention, the present invention has a central axis and a distance between projections of any two consecutive ones of the plurality of focal points on the central axis is fixed.

There is still further provided, in accordance with a second preferred embodiment of the present invention, an optical system including a) a multiple focal point optical assembly, having a plurality of focal points, which focuses each of a plurality of light beams onto a corresponding one of the multiple focal points and b) a motion assembly which moves the multiple focal point optical assembly, thereby to affect scanning.

Finally, in accordance with an alternative embodiment of the present invention, the multiple focal point optical assembly comprises a lens and an axis changing optical element, wherein the axis changing optical element shifts an axis of each incoming light beam and the lens focuses the shifted light beams onto their corresponding focal points.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 2A:
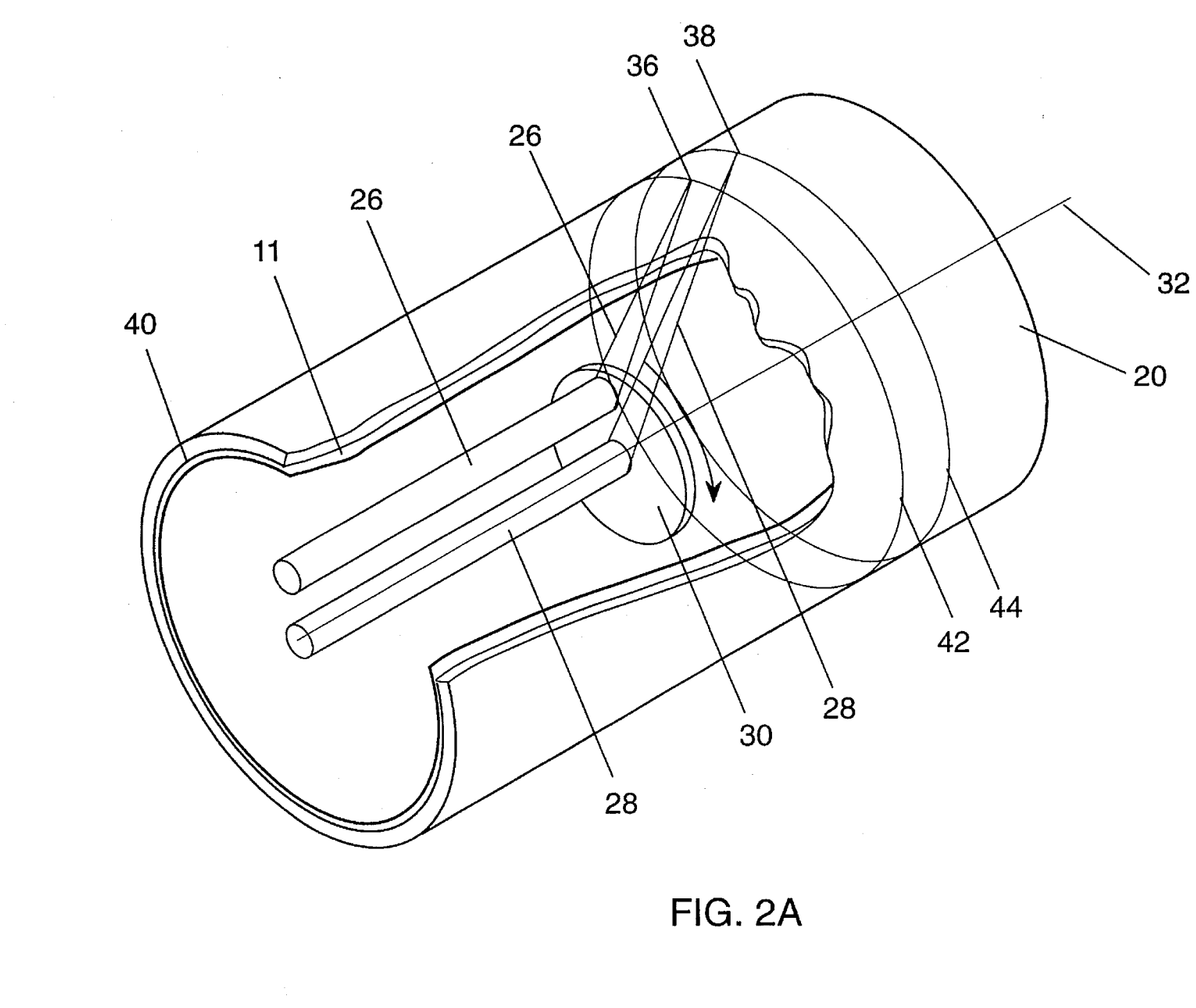
FIG. 2A is cutaway schematic illustration of an internal drum plotter employing a multiple focal point optical element, constructed and operative in accordance with a first embodiment of the present invention.

Reference is now made to FIG. 2A which illustrates an embodiment of the optical element of the present invention implemented within an internal drum plotter. It will be appreciated that the optical element of the present invention can be utilized within other types of scanning devices and that the internal drum plotter shown in the Figures is just one example scanning device.

The internal drum plotter typically comprises a cylindrical element 20 and a rotatable multiple focal point optical assembly typically comprising an optical element 30, constructed and operative in accordance with the present invention and concentric with and rotatable around a central axis 32 of cylindrical element 20.

Optical element 30 receives two collimated light beams 26 and 28 which carry intensity data for two consecutive lines of an image to be exposed onto medium 11. It is noted that light beam 28 is generally provided along the axis 32 of cylindrical element 20 and light beam 26 is provided parallel to but not colinear with axis 32.

Optical element 30 is typically characterized by at least two off-axis focal points, such as points 36 and 38, located at least two points on an inner surface 40 of cylindrical element 20. The distance D between the projection of any two consecutive points 36 and 38 on the central axis 32 is fixed and is related to the desired resolution of the plotter, as follows:

$$D = 1/\text{resolution\_of\_plotter} \tag{1}$$

In accordance with the present invention, each beam 26 and 28 carries a single line to be exposed during a single, 360 degree rotation of the optical element 30. This is illustrated in FIG. 1 by curves 42 and 44, respectively.

It is noted that, because the focal points 36 and 38 maintain their radial distance vis-a-vis the center of optical element 30 while the optical element 30 is rotated, curves 42 and 44 maintain their left-right orientation vis-a-vis one another during the rotation.

It is further noted that the optical element 30 described hereinabove performs three operations, a) focusing of the incoming light beams, b) changing the optical axis of the system to an "off-axis" direction, from along the central axis 32 to angled to the central axis 32, in an operation similar to that usually performed by a mirror, and c) separating the beams so that they shine at small angles to the off-axis optical axis, such that each beam focuses on a separate, corresponding focal point.

Thus, the multiple focal point optical element 30 provides an optical system having minimal optical elements which can operate with multiple beams. Although not shown in the Figures, the multiple focal point optical element 30 is typically also translated such that the multiple beams 26 and 28 trace multi-start helical curves on medium 11, rather than the circular curves 42 and 44.

Figure 2B:
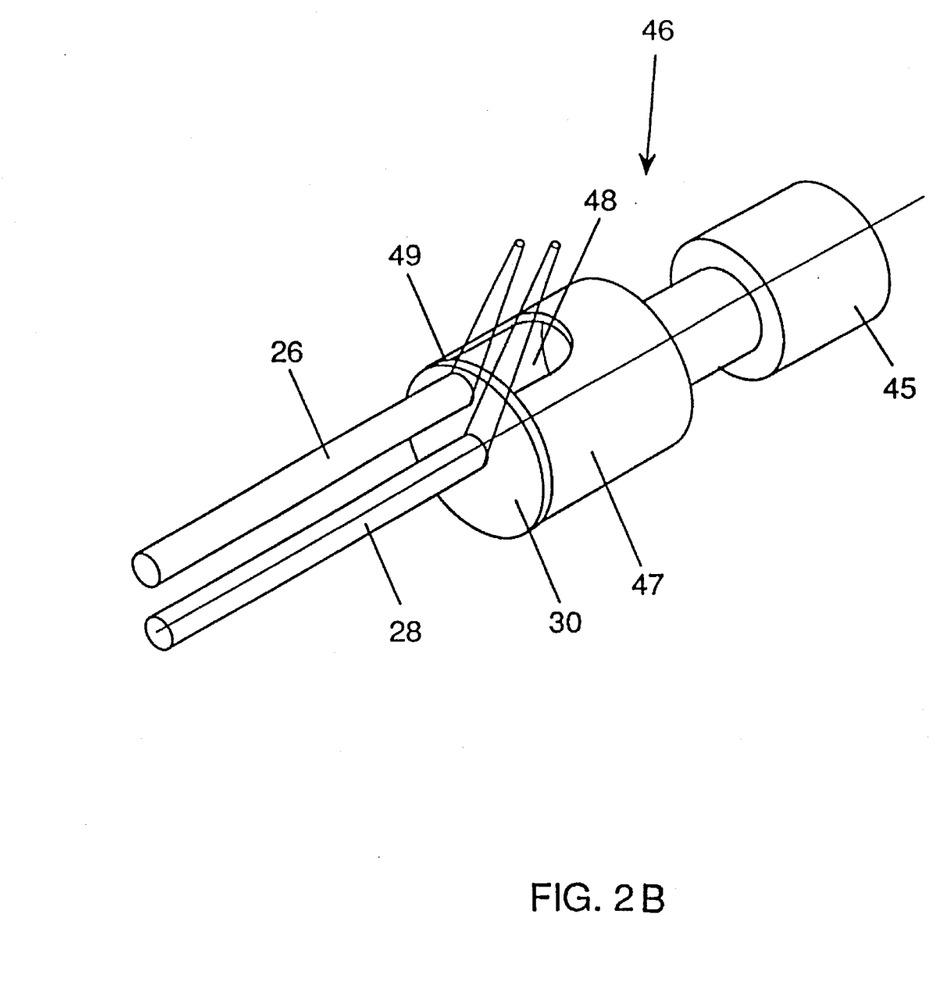
FIG. 2B is a schematic illustration of apparatus for rotating the multiple focal point optical element of FIG. 2A.

Reference is now briefly made to FIG. 2B which illustrates a rotating unit 46 which rotates the optical element 30. The rotating unit 46 typically comprises a motor 45 for rotating a housing 47 having an indentation 48 which is open towards an end 49. The optical element 30 is attached to housing 47 near the open end of indentation 48 such that the light beams 26 and 28 can pass through the optical element 30 and be focused on the medium 11 without being blocked by any portion of housing 47.

It will be appreciated that the optical element 30 may not completely deflect the beams 26 and 28. It is a feature of the present invention that housing 47 absorbs any light which is not deflected.

It is noted that, due to the non-symmetrical location of the beams 26 and 28 vis-a-vis the central axis 32, the spot shape of beam 26 may change during a single revolution of optical element 30. This problem is solved in the embodiment of FIG. 3, to which reference is now made, which provides a symmetrical configuration of the beams. The plotter of FIG. 3 is similar to that of FIG. 1; therefore, similar elements have similar reference numerals.

Figure 3:
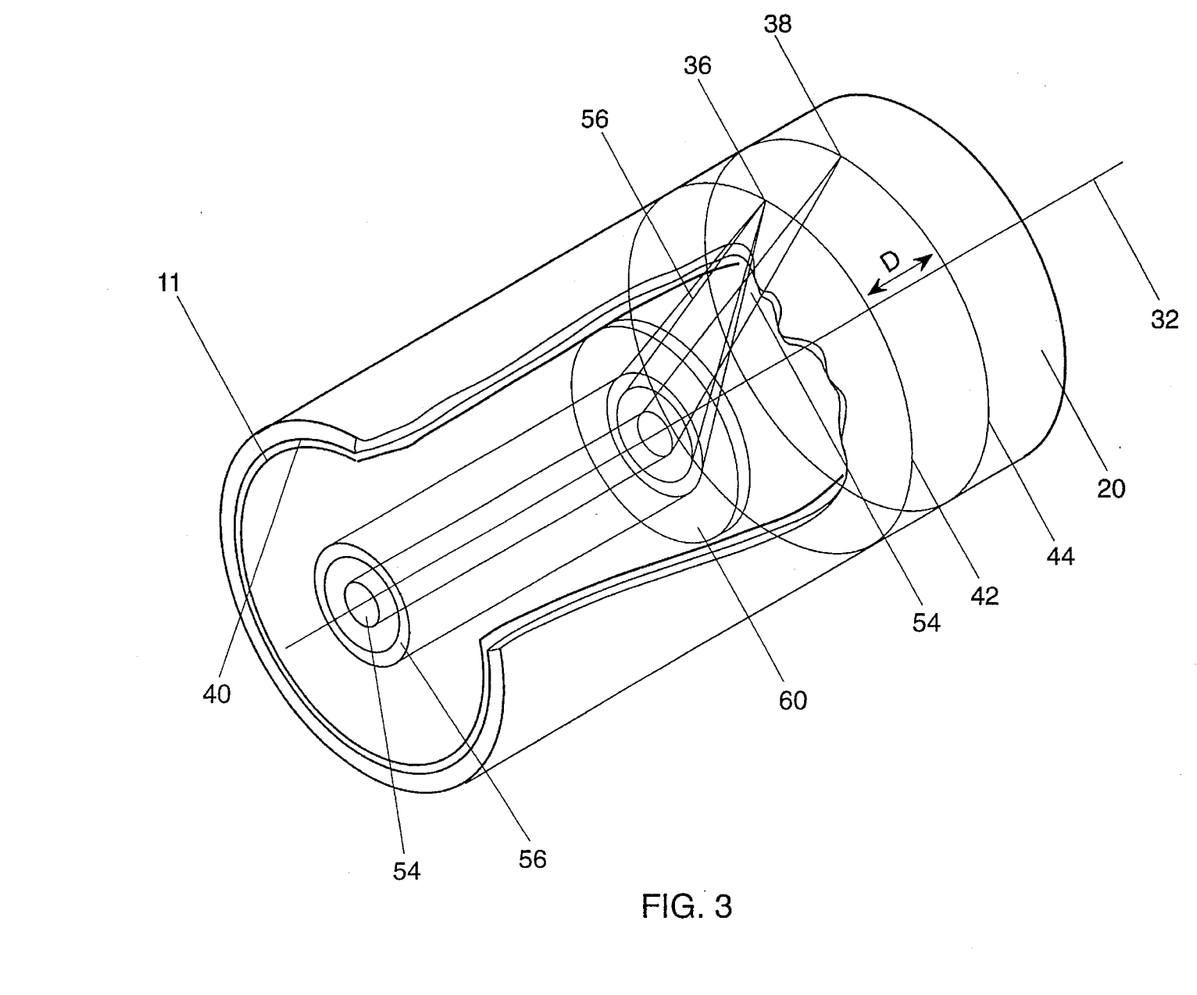
FIG. 3 is a schematic illustration of an alternative internal drum plotter employing an alternative multiple focal point optical element, constructed and operative in accordance with a second embodiment of the present invention.

The plotter of FIG. 3 receives at least two concentric light beams 54 and 56, where light beam 54 is the inner beam and light beam 56 is tubular. The beams 54 and 56 are focused by a rotatable multiple focal point optical assembly, typically comprising an optical element 60, onto focal points 36 and 38, as in the previous embodiment. Optical element 60 is similar to optical element 30 but is optimized to work with the concentric light beams 54 and 56.

Figure 4A:
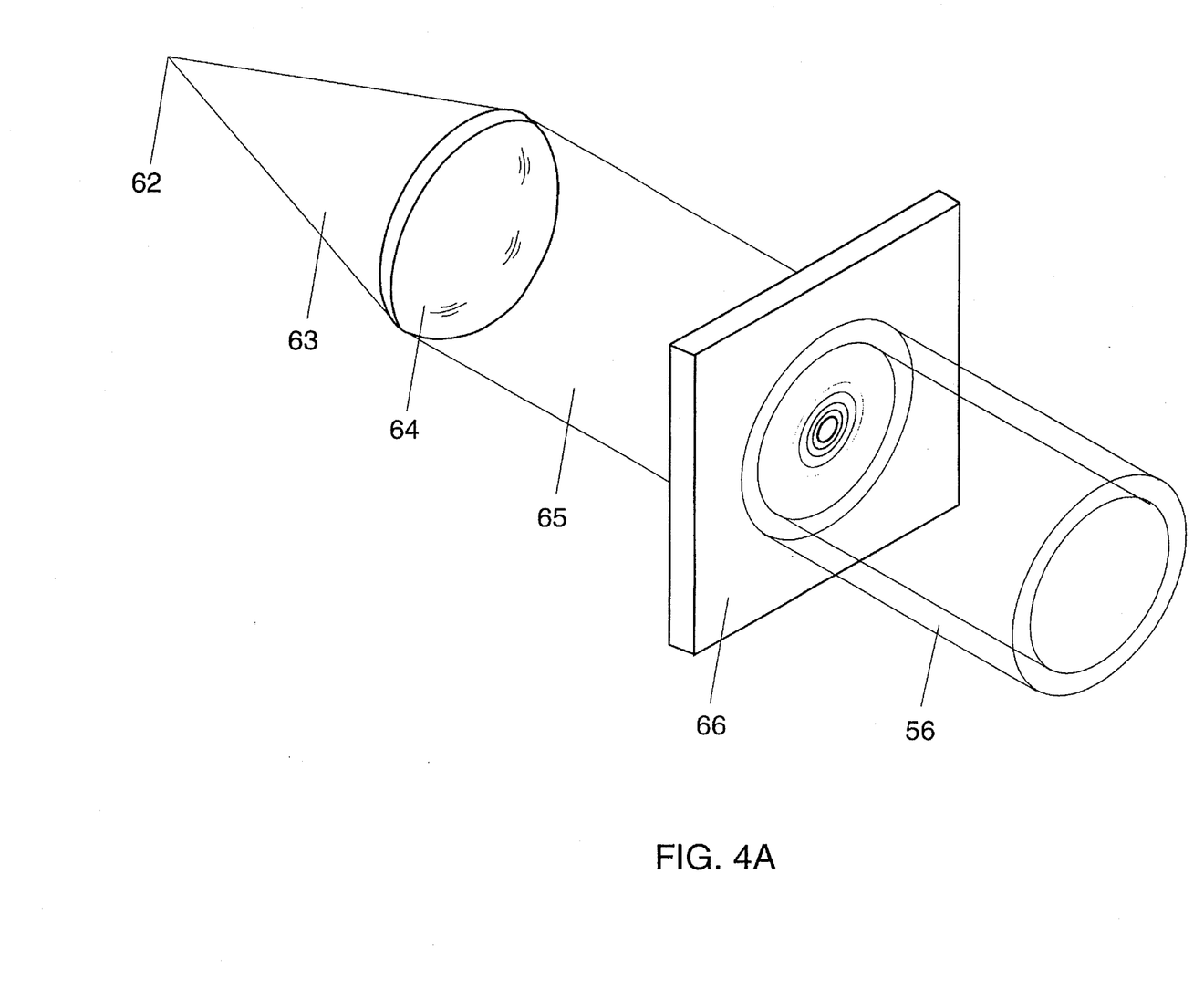
FIGS. 4A and 4B are schematic illustrations of systems for providing a tubular light beam, useful in the plotter of FIG. 3.
Figure 4B:
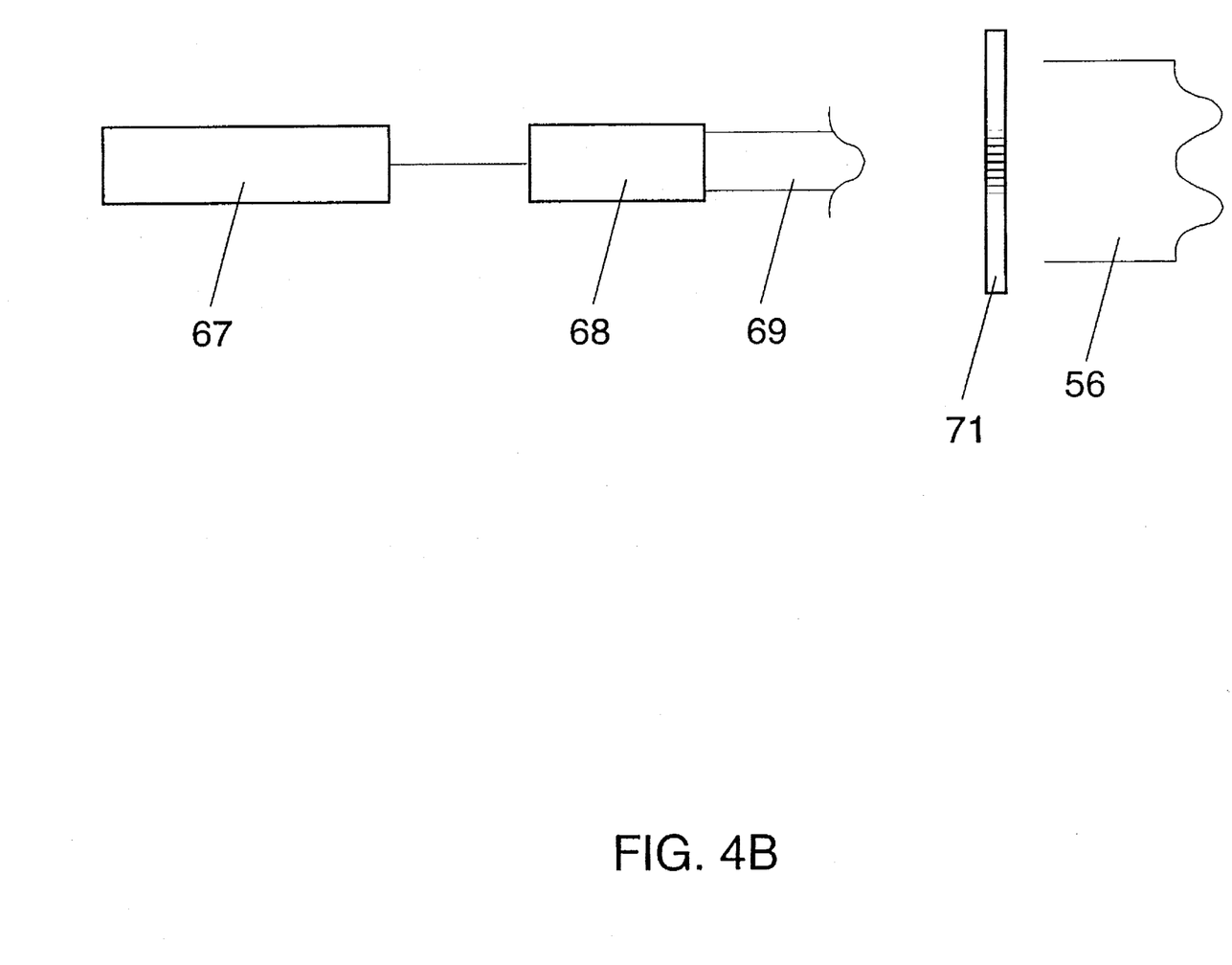

The tubular light beam 56 can be produced in many ways, two of which are illustrated in FIGS. 4A and 4B to which reference is now briefly made.

The system of FIG. 4A typically comprises a point light source 62 for providing a light beam 63, a lens 64 for collimating the light beam 63 to provide a collimated light beam 65 and a mask 66 for masking out the central portion of collimated light beam 65 thereby to produce tubular beam 56.

The system of FIG. 4B typically comprises a laser 67 providing a light beam which is expanded by a beam expander 68 to provide a wide Gaussian light beam 69 having a Gaussian intensity shape. The beam 69 is provided to a graded absorption mask 71 which produces a tubular beam 56 having a shape as shown in FIG. 4B.

The beams 54 and 56 can be combined together, such that beam 54 is within beam 56 as shown, with any suitable beam combining apparatus. For example, a beam splitter can be utilized.

Optical elements 30 and 60 can be manufactured in a number of ways as described in detail hereinbelow. They can be formed of a plate of glass onto which a holographic pattern or a diffractive pattern has been produced. Alternatively, they can be formed of an optical element having a flat surface on which is produced an appropriate diffractive or holographic pattern.

The article, "Holographic Optical Elements (HOEs)" by B. J. Chang, et al, *Advances in Laser Scanning Technology*, SPIE Proceedings, Vol. 299, pp. 157–162, August 1981, incorporated herein by reference, describes one method of producing HOEs for scanning devices.

Figure 5A:
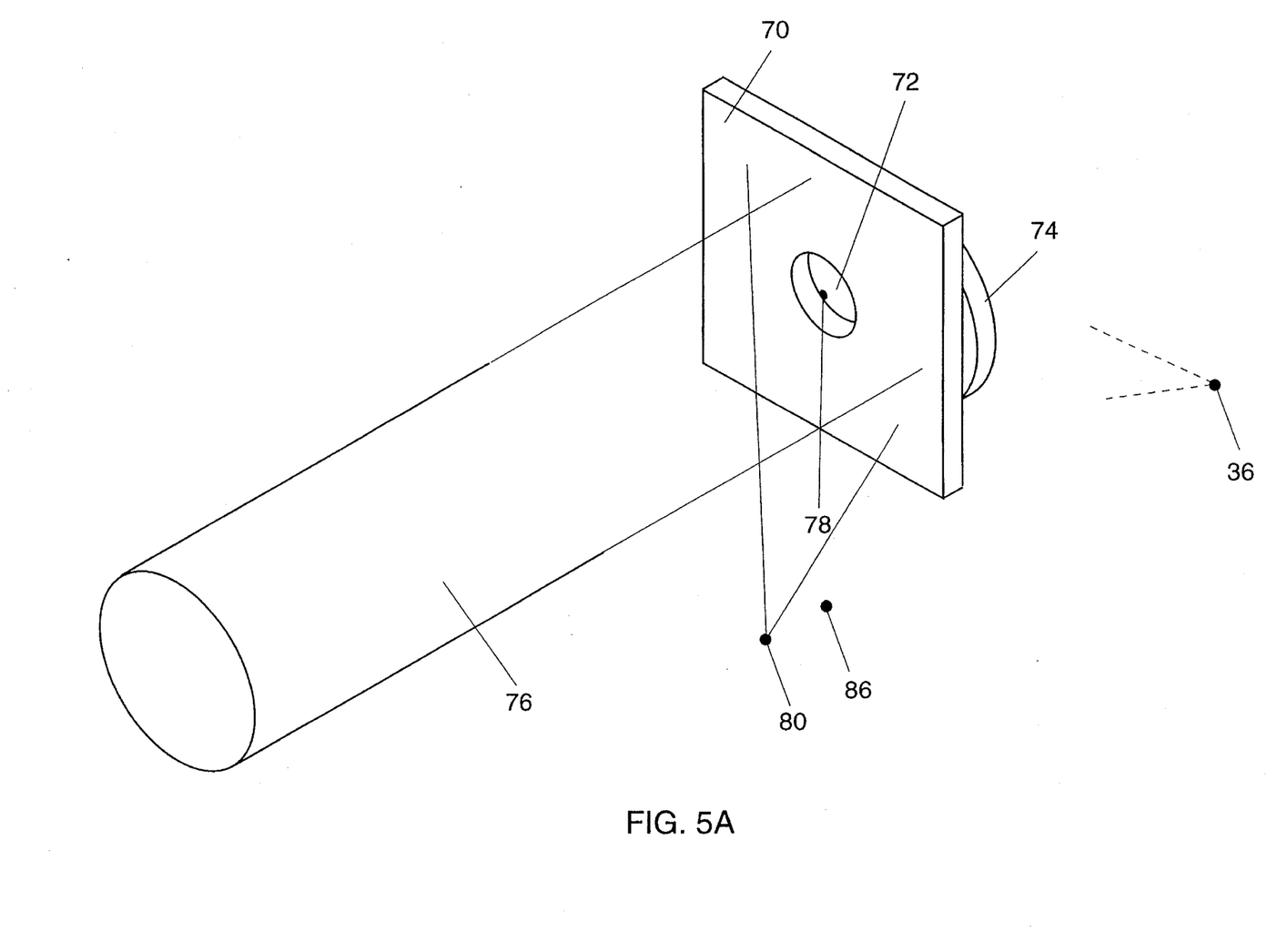
FIGS. 5A and 5B are schematic illustrations of masking techniques for creating holographic embodiments of the multiple focal point optical element of FIG. 3.
Figure 5B:
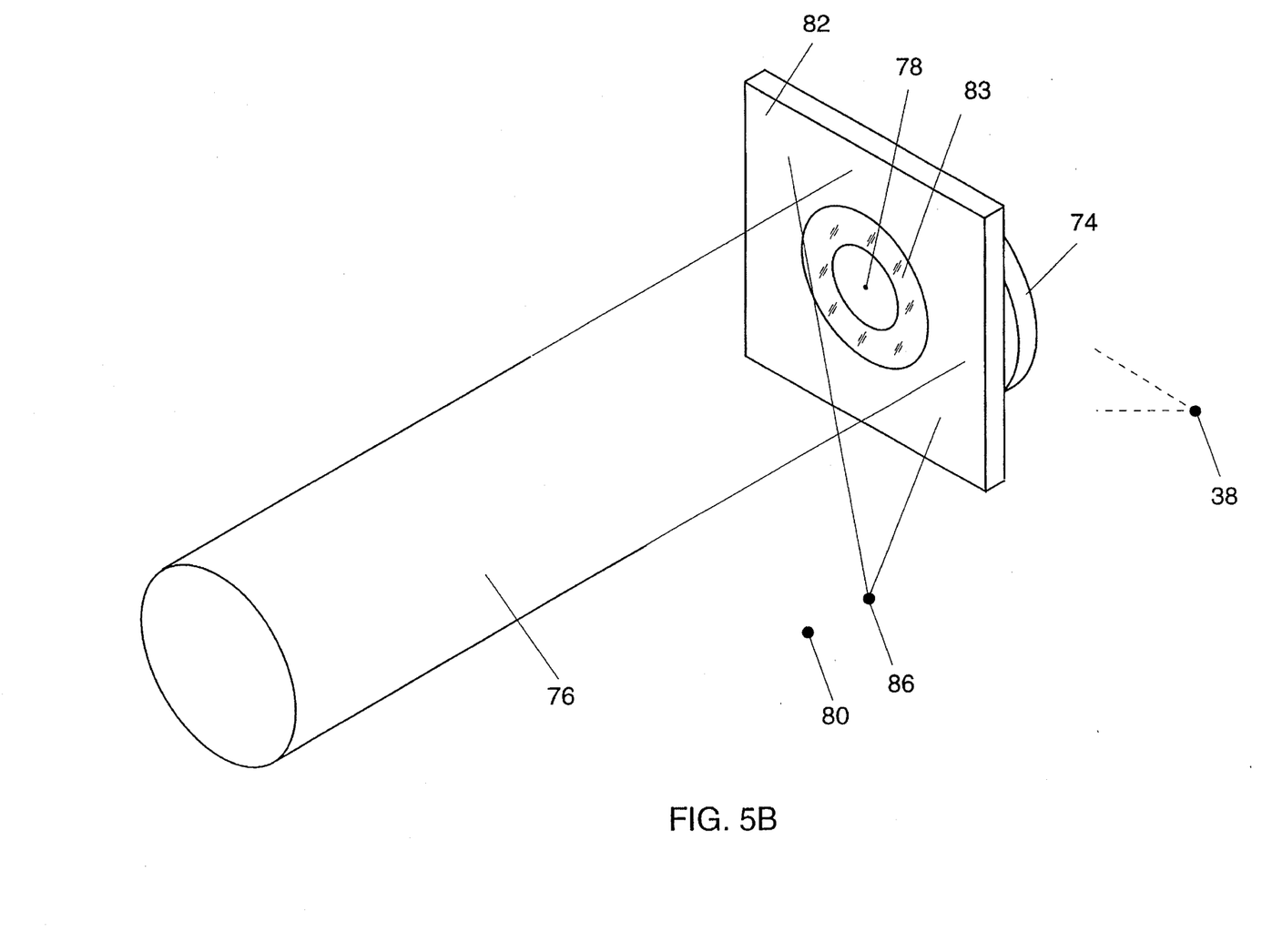

Reference is now made to FIGS. 5A and 5B which illustrate one method for producing optical elements 30 and 60 as holographic optical elements.

A first mask 70 (FIG. 5A), having a central circular or other appropriately shaped opening 72, is placed over a holographic plate 74. The holographic plate 74 is exposed with both a first collimated light beam 76, whose axis is colinear with a center point 78 of opening 72, and a point light source 80 placed in a complementary location to the desired focal point 36. This produces the focal point 36 in holographic plate 74 for light beams which impinge upon the area of opening 72.

Following the first exposure, the holographic plate 74 is reexposed as shown in FIG. 5B. A mask 82, having a donut shaped opening 83 concentric with the center point 78, is placed over holographic plate 74. The plate 74 is reexposed with the collimated light beam 76 and a point light source 86 placed in a complementary location to the desired focal point 38. This produces the focal point 38 for light beams which impinge upon the area of torus shaped opening 83.

The above-described process is repeated for all focal points, after which the holographic plate 74 is developed.

The light beams impinging upon the optical element 30 or 60 formed using the masks shown in FIGS. 5A and 5B may not have the desired spot shapes. If so, the exposure process can be altered in accordance with the techniques described in the article "Holographic Laser Scanners Using Generalized Zone Plates", by Yuzo Ono and Nobuo Nishida, published in *Applied Optics*, Vol. 21, No. 24, Dec. 15, 1992, pp. 4542–4548. The article is incorporated herein by reference.

The element can also be optimized for the type of light beam (standard or tubular) which arrives to the optical element.

In accordance with an alternative embodiment of the present invention, optical elements 30 and 60 can be formed of diffractive optical elements designed through analysis of both the incoming waveforms of the incoming beams 26 and 28 or 54 and 56 and of the desired output waveforms. Such a waveform description can be provided to any company producing diffractive optical elements. One such company is Holo-Or Ltd. of Kiryat Weizman, Israel.

It is noted that, in order for the optical elements 30 and 60 to accurately perform the focusing, direction changing and separation described hereinabove, the manufacturing processes of the elements 30 and 60 must be very accurate.

Figure 6:
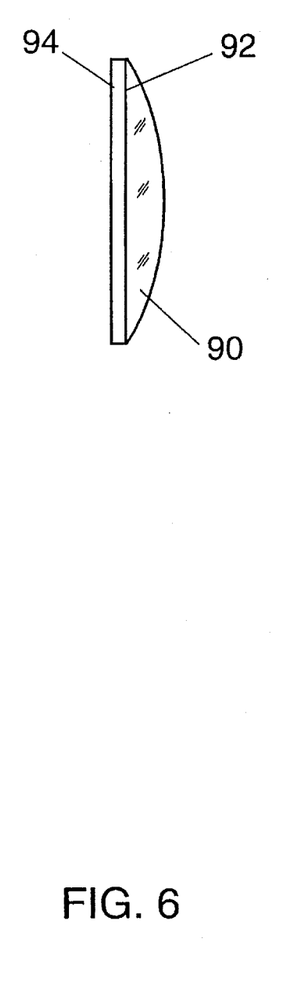
FIG. 6 is a schematic illustration of the optical element of FIGS. 2A and 3 formed of a optical element having incorporated thereon a diffractive optical element.

With reference to FIG. 6, the same functionality can be achieved with a lens 90 on whose flat surface 92 a diffractive optical element 94 is etched or an holographic shape is developed. The diffractive optical element 94 (or holographic shape) first separates and shifts the direction of the axes of the incoming beams and the lens 90 then focuses the shifted and separated beams.

It will be appreciated that, although the optical elements 30 and 60 have been described in conjunction with internal drum plotters, they are useful in any type of scanning device, whether operative for reading or for writing.

It will be appreciated by persons skilled in the art that the present invention is not limited to what has been particularly shown and described hereinabove. For example, the optical elements can be formed in any suitable manner, including as an assembly of more than one optical element. Rather the scope of the present invention is defined only by the claims which follow:

I claim:

1. An internal drum plotter comprising:
    a drum having an internal surface for an internal light sensitive medium;
    at least one light source for providing a plurality of modulated light beams;
    a multiple focal point optical element having a plurality of focal points one for each light beam, said multiple focal point optical element being positioned within said drum for focussing said plurality of light beams each onto its corresponding one of said plurality of facal points located on said light sensitive medium; and
    a motion assembly which moves said multiple faocal point optical element, thereby to affect simultaneous plotting of said plurality of modulated light beams in respective discrete lines on said light sensitive medium axially spaced from one another.

2. A scanning device according to claim 1 and wherein said focal points are off-axis to a rotation axis of said multiple focal point optical element.

3. A scanning device according to claim 1 wherein a first one of said light beams impinges upon a first area of said multiple focal point optical element and wherein a second one of said light beams is parallel with said first one of said light beams and impinges on a second area of said multiple focal point optical element.

4. A scanning device according to claim 3 and wherein said first area is circular and said second area is annular and concentric with said first area.

5. A scanning device according to claim 1 wherein a first one of said light beams impinges upon a first area of said multiple focal point optical element and wherein a second one of said light beams is concentric with said first one of said light beams and impinges on a second area of said multiple focal point optical element.

6. A scanning device according to claim 1 and wherein said multiple focal point optical element is an holographic optical element.

7. A scanning device according to claim 1 and wherein said multiple focal point optical element is a diffractive optical element.

8. A scanning device according to claim 1 and wherein said motion assembly comprises a housing operative to absorb a portion of said light beams not focussed on said focal points.

9. A scanning device according to claim 1 having a central axis and wherein a distance between projections of any two consecutive ones of said plurality of focal points on said central axis is fixed.

10. An internal drum plotter according to claim 1, wherein said optical element is supported for rotation within said drum about an axis of rotation and said spaced lines produced by the optical element on said light sensitive medium are circular.

11. An internal drum plotter according to claim 1, wherein adjacent ones of said lines are axially spaced by a constant distance.

* * * * *